United States Patent
Chrisman

(10) Patent No.: US 12,344,748 B2
(45) Date of Patent: Jul. 1, 2025

(54) CARBON BLACK FROM BIOMASS

(71) Applicant: Norse Biotech AS, Elverum (NO)

(72) Inventor: Ray W Chrisman, Midland, MI (US)

(73) Assignee: NORSE BIOTECH AS (NO)

( * ) Notice: Subject to any disclaimer, the term of this patent is extended or adjusted under 35 U.S.C. 154(b) by 821 days.

(21) Appl. No.: 17/311,327

(22) PCT Filed: Dec. 13, 2019

(86) PCT No.: PCT/US2019/066129
§ 371 (c)(1),
(2) Date: Jun. 5, 2021

(87) PCT Pub. No.: WO2020/123894
PCT Pub. Date: Jun. 18, 2020

(65) Prior Publication Data
US 2022/0017754 A1     Jan. 20, 2022

Related U.S. Application Data

(60) Provisional application No. 62/766,610, filed on Dec. 14, 2018.

(51) Int. Cl.
*C09C 1/50*     (2006.01)

(52) U.S. Cl.
CPC ..................................... *C09C 1/50* (2013.01)

(58) Field of Classification Search
CPC .... C09C 1/50; C09C 1/44; C09C 1/56; C09C 1/48; C09C 1/60; C09C 1/482; C09C 1/485; C09C 1/487; C09C 1/52; C09C 1/54; C09C 1/565; C09C 1/58
See application file for complete search history.

(56) References Cited

U.S. PATENT DOCUMENTS

| | | | | |
|---|---|---|---|---|
| 2,972,520 A | * | 2/1961 | Eaton | C09C 1/48 423/459 |
| 2011/0236816 A1 | * | 9/2011 | Stanyschofsky | C09C 1/54 423/449.1 |
| 2017/0029706 A1 | | 2/2017 | Schneider | |
| 2017/0058127 A1 | * | 3/2017 | Naduvile Veettil | D21C 1/06 |
| 2018/0134899 A1 | | 5/2018 | Mulqueen | |

FOREIGN PATENT DOCUMENTS

| | | | | |
|---|---|---|---|---|
| CN | 106497149 | * | 3/2017 | ............. B82Y 30/00 |
| CN | 106497149 B | | 3/2017 | |
| FI | 126078 B | | 6/2016 | |
| WO | 2000/014162 A1 | | 3/2000 | |
| WO | 2011/159154 A1 | | 12/2011 | |
| WO | 2017/178513 A1 | | 10/2017 | |

OTHER PUBLICATIONS

Snowdon, et al., A Study of Carbonized Lignin as an Alternative to Carbon Black, ACS Sustainable Chem. Eng. 2014; 2: 1257-1263 (Year: 2014).*

Chakar, et al., Review of current and future softwood kraft lignin process chemistry, Industrial Croips and Products 2004; 20: 131-141.*

Fitzer, et al., Recommended Terminology For The Description of Carbon As A Solid, Pure & Appl. Chem. 1995; 67(3): 473-506 (Year: 1995).*

* cited by examiner

*Primary Examiner* — Daniel C. McCracken
(74) *Attorney, Agent, or Firm* — Technology Law PLLC; Karen L. Kimble

(57) ABSTRACT

A process for making carbon black is described by pyrolizing unsulfonated lignin or by pyrolizing aromatic monomers formed by hydrolyzing a biomass comprising unsulfonated lignin.

10 Claims, 1 Drawing Sheet

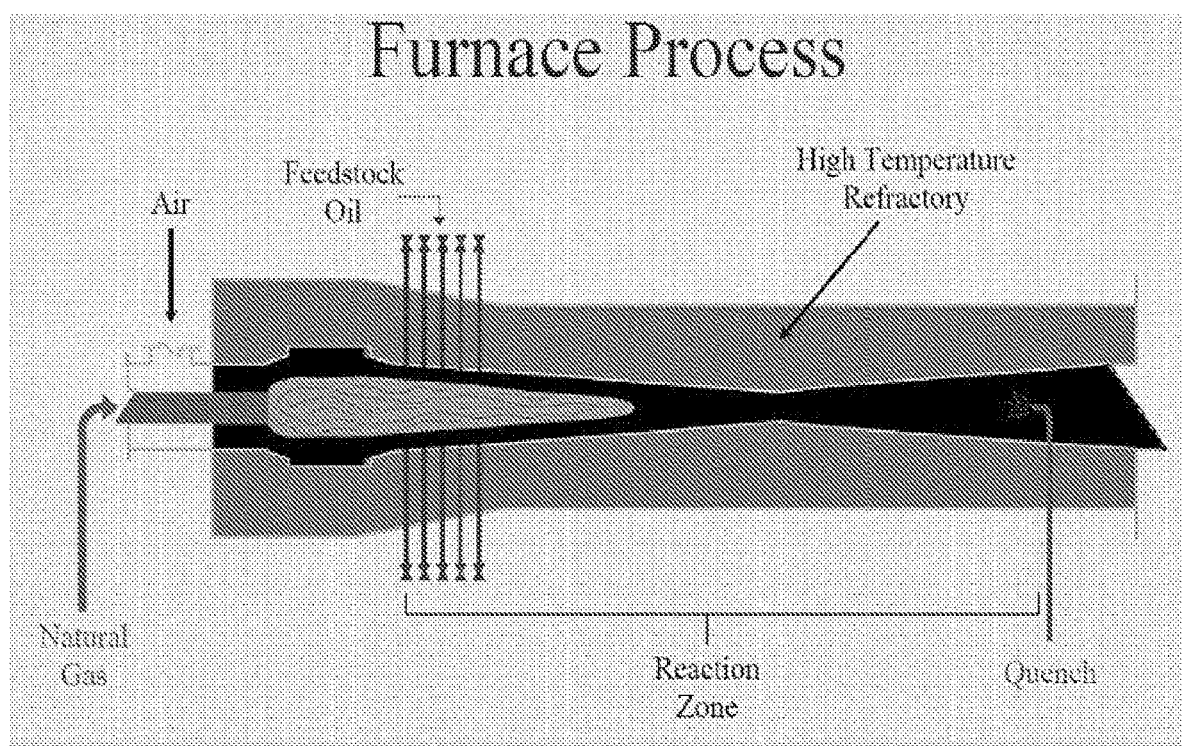

CARBON BLACK FROM BIOMASS

FIELD OF THE INVENTION

The instant invention provides a method to produce carbon black from non-sulfonated lignin that has been separated from biomass using a method that maintains the cellulose and hemicellulose in forms that can be recovered for other uses such as for fermentation feed or conversion to various chemicals. High quality carbon black which is suitable for use in making tires and other high valued products has a complex range of micro-structures that have been developed over the years to fine tune its performance.

BACKGROUND OF THE INVENTION

Lignin is considered to be the second most available renewable feedstock after cellulose. It is often at least 20% of the biomass though the amount varies significantly across green plant species and also depending on the part of the plant. Lignin exists as a polymer in plants and is intertwined with the biopolymers hemicellulose and cellulose. Lignin is the only one of the three biopolymers that contains aromatic groups. The main commercial source is from the Kraft process that is used to separate lignin from cellulose which is then used for making paper. In that process the lignin is sulfonated to improve its solubility. The bulk of the separated lignin is burned for process energy and to recover the sulfur. The presence of the sulfur on the lignin polymers reduces the utility of the lignin for other uses.

New processes are being developed to separate biomass (including lignin) for a range of uses from fuels to new sources of petrochemical feedstocks. Many of these new separation processes do not sulfonate the lignin during processing, which expands the potential to use it as a feedstock for other processes. These newly produced lignin polymers offer the potential to depolymerize the lignin polymer into monomers with a chemical process called hydrolysis. The expectation is that lignin monomers can be further processed to produce aromatic feedstocks, such as benzene, toluene, and xylene, (BTX), as a valuable feedstock for the chemical process market.

Carbon black can be made by the process described in detail in a chemical engineering thesis which modeled the reactions. In general, this described process uses gas or oil combustion to develop a very hot, over 1000° C., flowing gas stream to which byproduct aromatic molecules refined from crude oil are fed. Aromatic molecules are preferred since they tend to produce purer, higher valued, small carbon particles with high surface areas. The heat decomposes the molecules to their atomic constituents. The carbon atoms then recombine into nanoscale, essentially pure carbon particles that are 20 to 100 nm in diameter. These particles can then aggregate into chains that are up to 1 micron in length. These strongly bonded chains can form weakly bonded agglomerates. The nanostructure determines the performance in demanding uses such as for rubber modification in tire production.

While existing carbon black works quite well in the over 14 million metric ton per year carbon black market, current users would like to move to renewable sources of the material. As indicated in US published patent application 2017/0029706, one very reasonable approach to a more renewable product is to pyrolyze used tires. However this approach only recovers a somewhat reduced quality carbon black from the tires; the approach also limits the range of potential carbon black products to carbon black found in tires in the recycle stream. In addition, this approach needs to find uses for the additional 60%-80% of other materials found in the used tires.

To produce a range of renewable high quality carbon black one problem is that available biobased feedstock carbon sources such as cellulose and hemicelluloses have significant amounts of oxygen in them in addition to having existing valuable uses. The other high volume biobased potential feedstock, lignin polymer, is mostly available from paper production, which sulfonates the lignin in the Kraft process to facilitate removal from the desired cellulose fibers.

One approach tried to satisfy this market for biobased carbon black is to attempt to remove the sulfur from the Kraft lignin that is produced in paper making. While this has been shown to be viable, there are multiple processing steps involved in the process to remove the sulfur which increases the cost of the carbon black.

Another approach is to thermally treat the bulk biomass. This has been shown to be useful in published US application 2018/0134899 on May 17, 2018. The problem with this approach is that it reduces the potential to use the cellulose and hemicelluloses for other valuable uses, which significantly reduces the ability to develop a sustainable biomass processing facility. Maybe more importantly, it is not clear that the final product carbon black has the desired range of microstructures to satisfy high quality carbon black users.

In addition, the sustainability of carbon black can be improved even more by replacing the oil or gas that is burned in a traditional carbon black facility to produce the high reactor temperatures and replacing them with a plasma system to generate the high reactor temperatures. Many of the processing parameters required for plasma process operation are described in a reference paper, *International J. of Chem. Reactor Engineering*, Vol. 3 [2005], Article A4.

Clearly, a better process to produce carbon black from a renewable resource such as biomass is needed and where such process is economically viable and provides a high purity product for the end users.

BRIEF DESCRIPTION OF THE INVENTION

The process of instant invention uses lignin from biomass separation reactions that do not add sulfur to the lignin in the biomass separation step. The separated lignin polymer is then hydrolyzed to monomer aromatic groups. These monomers are then used as the feedstock for carbon black formation. A present process for making carbon black requires pyrolizing unsulfonated lignin.

In another embodiment biomass comprising lignin is exposed to pressurized water heated to a temperature above 100° C. to hydrolyze the lignin to produce aromatic lignin monomers which are then used as the feedstock for carbon black formation. More specifically, a process for making carbon black requires: (a) exposing biomass comprising lignin to pressurized water heated to a temperature above 100° C. to depolymerize the lignin to aromatic monomers; and (b) pyrolyzing the aromatic monomers to form carbon black.

In another embodiment aromatic lignin monomer feedstock is decomposed in a carbon black reactor using combustion of either a biosourced hydrocarbon or natural gas or oil as the heat source for carbon black formation.

In yet another embodiment the heat source for a carbon black reactor is a plasma heating system.

Another process for preparing carbon black comprises:
a. separating the lignin polymer from the biomass using pressurized water at a temperature of about 160° C.;
b. separating the hemicellulose which is mostly converted to monomers from the solids;
c. heating the solids to a higher temperature to liquefy the lignin polymer while still not dissolving the cellulose;
d. separating the melted lignin polymer from the biomass to retain the cellulose solids;
e. maintaining the lignin in pressurized water at a temperature of about 170° C. for a sufficient time to hydrolyze the lignin to monomers;
f. flashing off the water and drying the monomers; and
g. feeding the dried monomers into a high temperature reactor to form the carbon black.

BRIEF DESCRIPTION OF THE DRAWINGS

FIG. 1 depicts a carbon black reactor and shows the various zones of the reactor

DETAILED DESCRIPTION OF THE INVENTION

Referring now to FIG. 1, therein is depicted the furnace process for making carbon black using a feedstock oil comprising aromatic components. In the present invention, the feedstock oil is made by hydrolyzing lignin. There are various known processes to hydrolyze lignin from biomass such as the Renmatix process; however, many of them have not proven to be commercially feasible for a variety of reasons (e.g., costs of the monomers, ability to use other isolated products from the process to offset costs or environmental issues, undesired sulfur present in the products usually from the Kraft process). In a preferred embodiment of the present invention, the process is run under pressure to maintain the water as a liquid at higher temperatures to hydrolyze the lignin polymers to monomers. The present process uses biomass where lignin is exposed to pressurized water heated to a temperature above 100° C. to hydrolyze the lignin to produce aromatic lignin monomers, which are then used as the feedstock for carbon black formation. It is important that no sulfur is present in the monomers. Any process that provides these lignin monomers from biomass without sulfur (non-Kraft process) may be used for this step in the process.

A highly preferred heat source for making carbon black using the furnace process of the instant invention is a plasma heat source.

Users of carbon black require a controllable microstructure and also pure carbon with very low levels of other elements present which can cause problems with the performance or can be a toxicity issue in food and cosmetic products. For these various uses of high quality carbon black, low levels of sulfur as well as low levels of trace metals and other elemental contaminates are important.

Surprisingly, sulfur free aromatic lignin monomers, unlike Kraft lignin, are also low in trace metals and other elemental contaminates and can be a sustainable source of feedstock for making high quality carbon black. The present process does require appropriate processing adjustments to account for the higher amount of oxygen present in the molecules compared to the oil based aromatic feeds.

The lignin monomers are solids at ambient temperatures, unlike the aromatics from oil production. The lignin monomers can be fed to the high temperature cracker as a melt or dissolved in liquids such as alcohols. Lignin can also be fed as fine powder particles in the instant invention. The key is to adjust the rate of addition of the lignin to the form of addition to insure rapid decomposition of the lignin monomers to carbon atoms. Higher temperatures facilitate the decomposition process.

While there are several processes to separate lignin that do not sulfonate the lignin, the hydrothermal liquefaction (HTL) process is very environmentally friendly and efficient. The process can also be used to hydrolyze the lignin polymer to its monomers, which also improves the efficiency of the operation.

It is also possible to hydrolyze the lignin polymer with techniques known in the art such as with acids or with enzymes, but the combination of biomass separation with the lignin hydrolysis step makes the HTL process very useful for preparing the lignin monomers.

In general there are three main monomers available from lignin polymer hydrolysis, namely: P coumaryl alcohol with a melting point of about 174° C.; Coniferyl alcohol with a melting point of 74° C.; and Sinapyl alcohol with a melting point of about 61° C. P coumaryl alcohol is mostly found only in grasses while the relatively low melting Coniferyl alcohol is the dominate form in grasses and also in softwood trees. Hardwood trees have about equal amounts of Coniferyl alcohol and Sinapyl alcohol.

In most cases the melted Coniferyl alcohol can serve as the solvent for the other monomers though it can also be dissolved in solvents such as alcohols to be used as a feedstock.

If desired the solid monomers can be converted to a very fine powder and fed into the reactor with pneumatic conveying. As previously mentioned, the key to the addition method is to have very fine control over the rate of addition to insure the molecules are rapidly decomposed to atoms.

Various thermal reactors can be used to convert the lignin monomers to carbon black. The most widely used commercial process for making carbon black is called the furnace black process. It uses the combustion of natural gas or oil as the source of thermal energy. Enough air is metered into the process to just combust the hydrocarbon feed. At the end of the combustion zone the preheated aromatic feedstock is fed into the reactor. There are several designs for the reactor to increase mixing and improve heat transfer to the feedstock. These general furnace designs are compatible with the use of lignin as the feedstock though as mentioned feed rates, temperatures and residence times in the reactor need to be adjusted since lignin monomers have more oxygen than aromatics from hydrocarbon refineries. Such adjustments can be determined by one skilled in this art.

The process can be made more sustainable by using various biobased hydrocarbons such as land fill gas or bio-oil as the hydrocarbon feedstock for combustion heating. Some carbon from the combustion will be incorporated in the final carbon black products. Since the bio-carbon black may be more valuable, it is possible to determine the amount of biobased materials in the carbon black by measuring the C-14 content in the carbon black. Modern sources of biomass have a known amount of C-14 and oil and coal based processes have almost none.

It is also possible to reduce the energy costs and carbon dioxide production of the reactor by using plasma heating for the process. This known approach to achieving the high temperatures needed for decomposition of oil based aromatic feedstocks can also be used with aromatic lignin monomers as the feedstock. This energy source is very efficient and it can be easily adjusted to higher temperatures to provide a broad range of carbon black microstructures.

Discussion

The present invention will be further clarified by a consideration of the following example, which is intended to be purely exemplary of the invention.

EXAMPLES

Example 1

Using water as the only reactant, lignin polymer is separated from biomass using pressurized water at a temperature of 160° C. The hemicellulose, which is mainly 5 carbon sugars, can later be used for fermentation and are water soluble in this process. The hemicellulose is mostly converted to monomers by hydrolysis and is separated from the biomass solids by filtration. The solids are then heated to higher temperatures (about 150-160° C.) to liquefy the lignin polymer while still not dissolving the cellulose. The melted lignin polymer is separated from the biomass using a sintered metal frit to retain the cellulose solids. The lignin is then maintained in pressurized water at a temperature of 170° C. for a sufficient time to hydrolyze the lignin to monomers. The water is flashed off and the monomers are dried. The dried monomers are then melted and fed to the high temperature reactor shown in FIG. 1 to form carbon black. Adjustment of temperature, feed rate and residence time in the reactor provides a range of carbon black particle sizes.

Example 2

The lignin monomers are prepared as described in Example 1. The melted monomers are fed into the high temperature zone of a plasma heated reactor to form the carbon black. The reactor temperature, feed-rate, and the residence time in the reactor are carefully controlled to produce a range of carbon black particle size.

Example 3

The lignin monomers are prepared as described in Example 1. The dried monomers are dissolved in alcohol and this solution is fed to the high temperature zone of the reactor. The operating parameters are controlled to produce the desired range of carbon black particle sizes.

Example 4

The lignin monomers are prepared as described in Example 1. The dried solids are ground to a fine particle size and a solids feeder is used to inject the lignin monomers into the high temperature zone of the reactor. The operating parameters are controlled to produce the desired range of carbon black particle sizes.

Although the invention has been described with reference to its preferred embodiments, those of ordinary skill in the art may, upon reading and understanding this disclosure, appreciate changes and modifications which may be made which do not depart from the scope and spirit of the invention as described above or claimed hereafter. Accordingly, this description is to be construed as illustrative only and is for the purpose of teaching those skilled in the art the general manner of carrying out the invention.

What is claimed is:

1. A process for making carbon black comprising a furnace black process wherein biomass is first separated into component biopolymers of cellulose, hemicellulose, and lignin, and then hydrolyzing the lignin polymers to form unsulfonated aromatic lignin monomers which replace aromatics from hydrocarbon refineries as feed stock for the process.

2. The process of claim 1, wherein a furnace, as a carbon black reactor in the furnace black process having various zones in the reactor, is fed with molecules of unsulfonated aromatic lignin monomers that are pyrolyzed by heat.

3. A process for making carbon black by: (a) exposing biomass comprising natural lignin to pressurized water heated to a temperature above 100° C. to depolymerize the lignin to comprise aromatic monomers of coumaryl alcohol, coniferyl alcohol, and/or sinapyl alcohol; and (b) pyrolyzing the aromatic monomers to form carbon black.

4. The process of claim 3, wherein a furnace, functioning as a carbon black reactor having various zones in the reactor, is fed the unsulfonated aromatic lignin monomers as a feedstock oil.

5. The process of claim 4, wherein the furnace is heated by a plasma process.

6. A process for preparing carbon black from biomass which comprises:
   a. separating a natural lignin polymer from the biomass by solubilizing with pressurized water at a temperature of about 160° C.;
   b. separating hemicellulose from the biomass of step a, which is converted to hemicellulose monomers from solids of the biomass;
   c. heating solids from step b to a higher temperature to liquefy the residual lignin polymer solids while still not dissolving cellulose present in the residual ligand polymer solids;
   d. separating the liquefied lignin polymer of step c from the biomass to retain the cellulose;
   e. maintaining the liquified lignin polymer of step d in pressurized water at a temperature of about 170° C. for a sufficient time to hydrolyze the liquified lignin to lignin monomers;
   f. flashing off the water from step e and drying the lignin monomers; and
   g. feeding the dried monomers from step f into a high temperature reactor to form the carbon black.

7. The process of claim 6 wherein the step d has presented a sintered metal frit for the separation.

8. The process of claim 6 wherein the dried monomers from step f are dissolved in alcohol and this solution is fed to a high temperature zone of the reactor in step g.

9. The process of claim 6 wherein there are adjustments made in the reactor of temperature, feed rate, and residence time to provide a range of carbon black particle sizes for the application desired.

10. A process for making carbon black comprising a furnace black process wherein biomass is first separated into component biopolymers of cellulose, hemicellulose, and lignin, and then hydrolyzing the lignin polymers to form unsulfonated aromatic lignin monomers, wherein the unsulfonated aromatic lignin monomers are derived from unsulfonated lignin obtained from a Kraft process or black liquor, after removing the sulfur from the lignin, which unsulfonated aromatic lignin monomers are feed stock for the process.

* * * * *